United States Patent
Mirtain

[15] 3,667,529
[45] June 6, 1972

[54] HIGH SPEED RADIAL PLY TIRES

[72] Inventor: Henri Mirtain, Compiegne, France

[73] Assignee: Uniroyal Englebert France, Neuilly sur Seine, France

[22] Filed: May 20, 1970

[21] Appl. No.: 39,115

[30] Foreign Application Priority Data

May 30, 1969 France..................................6917845

[52] U.S. Cl..............................152/361, 152/356, 152/359
[51] Int. Cl..........................................................B60c 9/18
[58] Field of Search.................152/361, 354, 356, 357, 359

[56] References Cited

UNITED STATES PATENTS

| | | | |
|---|---|---|---|
| 3,126,042 | 3/1964 | Cegnar | 152/361 |
| 2,826,233 | 3/1958 | Cooper | 152/361 |
| 2,939,502 | 6/1960 | Hindin et al. | 152/361 |
| 3,240,249 | 3/1966 | Lugli | 152/361 |
| 3,481,386 | 12/1969 | Menell et al. | 152/361 |
| 3,516,465 | 6/1970 | Guyot | 152/361 |

FOREIGN PATENTS OR APPLICATIONS 1,140,534  3/1957  France..................................152/361

*Primary Examiner*—Drayton E. Hoffman
*Attorney*—Norbert P. Holler

[57] ABSTRACT

Radial ply pneumatic tires capable of being run at very high speeds are disclosed. Such tires are characterized by a tread-reinforcing breaker having a plural-layer non-metallic textile cord ply structure wider than the tread, with the cords oriented at a 0° angle to the median equatorial plane, and a single-layer ply structure, narrower than the tread, of metallic wires or strips oriented at a substantial bias angle, preferably between about 20° and 45°, to the said plane. The plural-layer ply structure is constituted by a single length of breaker cord fabric wound in a continuous spiral circumferentially of the carcass for at least a plurality of full turns. If the metal ply structure in such a tire is superposed onto the textile ply structure, the tire is additionally provided with means indicating the manner in which it should be mounted on a vehicle so as to have a specified direction of rotation during normal high speed forward movement of the vehicle.

27 Claims, 8 Drawing Figures

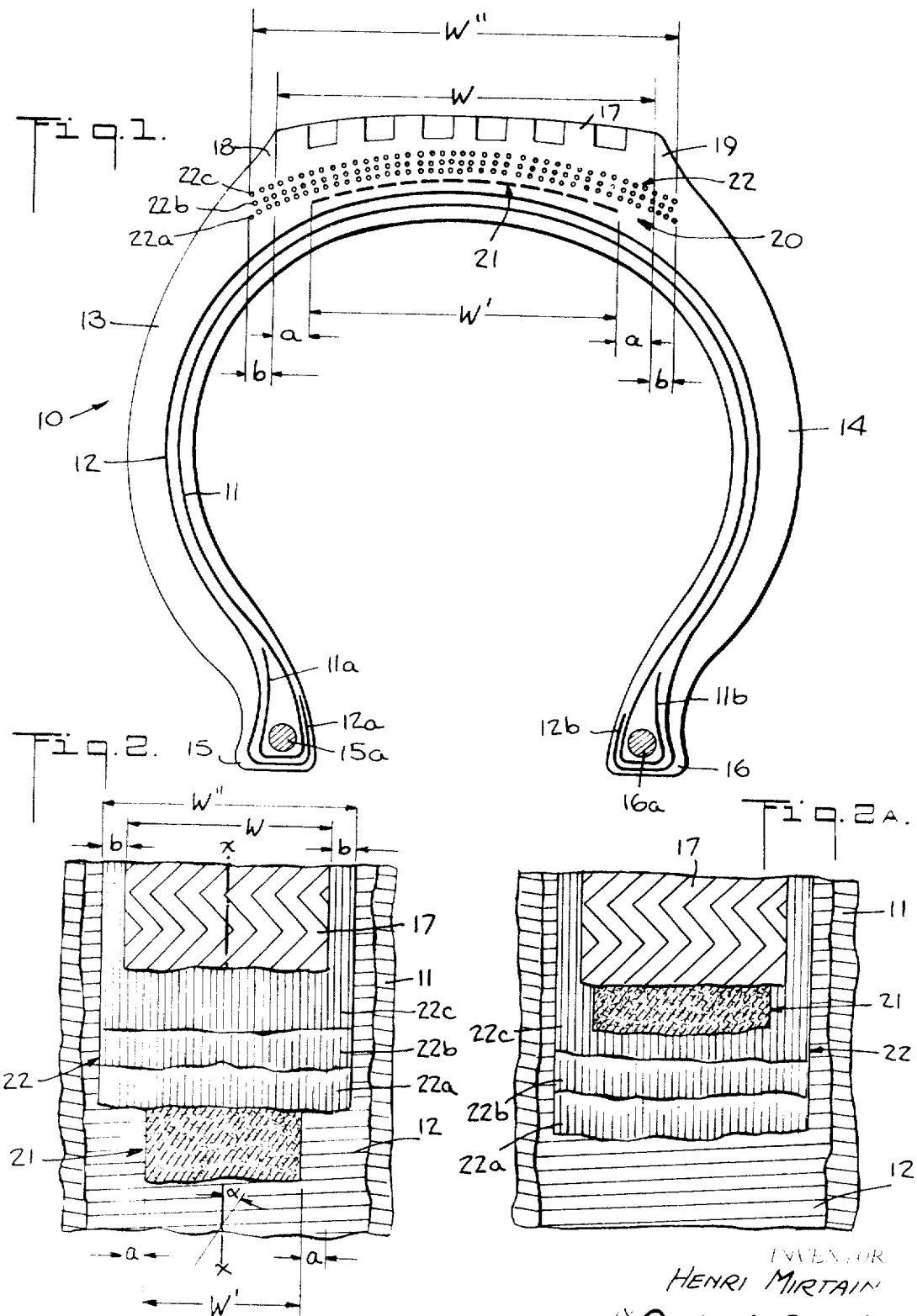

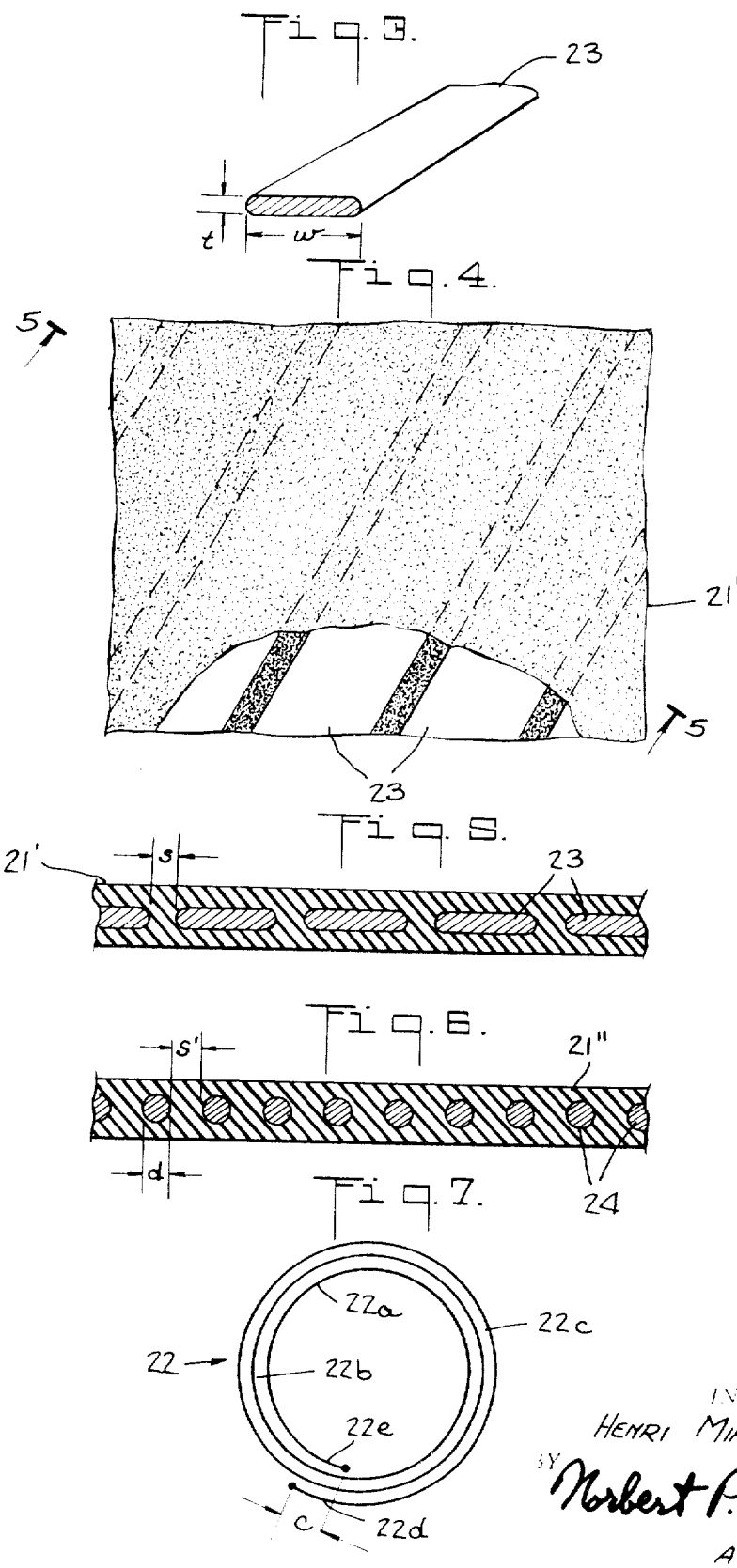

HIGH SPEED RADIAL PLY TIRES

This invention relates to belted pneumatic tires, and more particularly to radial ply automobile tires capable of running at very high speeds.

It is known that many types of conventional tires, especially radial ply carcass tires in which the tread is reinforced by a belt or breaker composed of superposed mutually crossed rubberized plies of parallel essentially inextensible cords or cables, often fail at high speeds because separations occur in the shoulder zones of the tires, where the edges of the breaker plies overlie the carcass. Such ply separations are due to the edges of the breaker plies becoming detached under the effects of centrifugal force acting on the tire, and this result is made even more likely, by the fact that the cords or cables in the breaker plies, being disposed obliquely to the median equatorial plane of the tire by virtue of the said plies being cut obliquely with respect to the longitudinal direction of the cords or cables therein, have a natural tendency to become separated at their edges. The edges of the breaker or belt plies thus constitute zones where the cut and free ends of the reinforcing elements, i.e., the cords or cables, by friction and by cutting, cause breaks both in the carcass plies and in the rubber of the belt.

It is an object of the present invention, therefore, to provide novel and improved belted pneumatic tire constructions by means of which the aforesaid drawbacks and disadvantages may be most efficaciously avoided.

A more particular object of the present invention is the provision of high speed radial tires in which the belt or breaker is well protected in the lateral junction zones thereof with the carcass against separations and deteriorations. Generally speaking, the objectives of the invention are achieved essentially by the provision of radial ply tires in which the tread-reinforcing belt or breaker interposed between the carcass and the tread is characterized by the combination of a single-layer metallic ply structure the width of which is at most equal to that of the tread, and a plural-layer textile ply structure which is wider than the tread, the single-layer ply structure comprising filiform or lamelliform metallic reinforcing elements oriented at an angle of between about 14° and 70°, and preferably about 45°, to the median equatorial plane of the tire, and the plural-layer ply structure comprising non-metallic textile cords or like filiform reinforcing elements oriented at a 0° angle, i.e., parallel, to the median equatorial plane of the tire, the several layers of the textile ply structure being constituted by a single length of 0° breaker cord fabric of appropriate width wound in a continuous spiral circumferentially of the tire carcass for a plurality of full turns and preferably for an additional small fraction, on the order of about 20 mm, of the next full turn. The presence of the single-layer metallic ply structure provides the necessary cornering forces even at low slip angles, while the inclusion of the continuously spirally wound plural-layer non-metallic textile ply structure with the cord elements thereof at a 0° angle to the median equatorial plane provides the necessary resistance to centrifugal forces especially in the shoulder regions of the tire where the flexure stresses are normally the highest.

The foregoing and other objects, characteristics and advantages of the present invention will be more clearly understood from the following detailed description of several embodiments thereof when read in conjunction with the accompanying drawings, in which:

FIG. 1 is a diagrammatic transverse or radial section through a tire characterized by a breaker construction including a plural-layer textile ply structure and a single-layer metallic ply structure according to one embodiment of the present invention;

FIG. 2 is a fragmentary plan view of the tire shown in FIG. 1, with parts broken away to show interior details;

FIG. 2A is a view, similar to FIG. 2, of a somewhat modified form of the tire shown in FIG. 1;

FIG. 3 is a fragmentary perspective view of a lamelliform metallic reinforcing element for the single-layer ply structure of the breaker shown in FIGS. 1 and 2;

FIG. 4 is a fragmentary plan view, on an enlarged scale, of a single-layer breaker ply structure utilizing lamelliform metallic reinforcing elements such as that shown in FIG. 3;

FIG. 5 is a sectional view taken along the line 5—5 in FIG. 4;

FIG. 6 is a sectional view similar to FIG. 5 but illustrating a single-layer breaker ply structure utilizing filiform metallic reinforcing elements; and FIG. 7 is a schematic axial view of the plural layer breaker ply structure according to one embodiment of the present invention.

Referring now to the drawings in greater detail, the tire 10 (FIGS. 1 and 2) according to one embodiment of the present invention comprises, for example, two radial or substantially radial superposed carcass plies 11 and 12, sidewalls 13 and 14 overlying the respective lateral regions of the carcass and terminating at their radially inwardmost edges in a pair of beads 15 and 16, a tread 17 overlying the crown region of the carcass and adjoining the sidewalls 13 and 14 at their radially outwardmost regions, i.e., the shoulders 18 and 19 of the tire, and a breaker 20 (the construction of which is the basic subject matter of the present invention, as will be more fully explained presently) interposed between the crown region of the carcass and the tread for reinforcing the latter. As usual, the marginal regions of the carcass plies 11 and 12 are turned up in opposite senses about the bead cores 15a and 16a, as shown at 11a, 12a and 11b, 12b in FIG. 1.

It is to be understood that the term "radial" referred to herein is commonly used in the pneumatic tire art to denote various tire carcass constructions having one or more reinforcement plies of weftless cord fabric extending from bead to bead with the cords in each ply substantially radial in orientation, i.e., oriented substantially normal to the beads and the crown centerline or median equatorial plane of the tire. In a monoply radial tire construction, therefore, the cords normally have a 90° bias angle, i.e., in the unshaped carcass they extend perpendicular to the planes of the beads. In a two-ply radial tire construction, however, such as that illustrated in FIGS. 1 and 2, the cords in each body ply are usually oriented not precisely radially but at oppositely disposed small and normally equal angles of up to about 10° with respect to the perpendicular to the bead and equatorial planes, in which case the respective body plies are said to have oppositely disposed bias angles of 80° or greater (but less than 90°). In four-ply or heavier radial tire constructions, similar opposed orientation of the cords in successive body plies is usually employed. The present invention is applicable to all tires having radial ply body or carcass constructions as above defined.

Referring now again to the drawings, the breaker 20 according to the basic principles of the present invention includes two distinct ply structures arranged in superposed relation to each other circumferentially of the carcass 11-12 and symmetrically with respect to the median equatorial plane x—x of the tire 10. In the embodiment illustrated in FIGS. 1 and 2, the ply structure 21 is disposed inwardly of the ply structure 22, but as will be pointed out hereinafter, the relationship may be reversed to dispose the ply structure 21 outwardly of the ply structure 22. In either case, however, the ply structure 21 is a single-layer arrangement of rubberized parallel metallic, preferably steel, reinforcing elements which may be either lamelliform (FIG. 3), i.e., in the form of flat strips or bands 23 with rounded edges (see also FIGS. 4 and 5 where the ply structure is designated 21'), or filiform, i.e. in the form of generally round wires or cables 24 (see FIG. 6 where the ply structure is designated 21''), oriented at a substantial bias angle to the median equatorial plane, while the ply structure 22 is a plural-layer arrangement of rubberized parallel breaker cords or cables made of non-metallic textile material such as rayon, glass fiber, nylon, polyester, and the like, oriented at an essentially 0° angle to the said plane. In either case, furthermore, the width W' of the single-layer ply structure 21 preferably is less than the width W of the tread or road-contacting surface 17 of the tire 10 by an amount a to each side of the medial equatorial plane ranging up to about 10 mm, although $a$ may be as low as 0 so that at most the ply structure 21 can be as wide as the tread. At the same time, the width W'' of the plural-layer ply structure 22 is greater than the width W of the tread by an amount $b$ to each side of the median equatorial plane preferably equal to at least about 10 mm, although under certain conditions $b$ might be somewhat less than 10 mm. As a general rule, the more the ply structure 22 extends into the sidewalls 13 and 14, the higher will be the high speed capacity of the tire, but a practical maximum limit of $b$ will be found to exist because of the 0° orientation of the cords in this ply structure, due to which the latter cannot be decreased in diameter too much without introducing an undesirable crimp or undulation into the cords. The maximum limit of $b$ thus will vary for different tire sizes and cannot be uniquely defined, nor need it be since it can be readily determined by those skilled in the art having regard to the aforesaid consideration of avoiding crimping of the cords. For optimum performance of tires according to the present invention, the width W' of the single-layer ply structure should be between the width W of the tread and not less than W minus 20 mm, while the width W'' of the plural-layer ply structure should be in the neighborhood of and preferably not less than about W plus 20 mm.

The metallic reinforcing elements in the single-layer ply structure, as previously mentioned, in all cases are oriented at a substantial bias angle $\alpha$ to the median equatorial plane $x-x$ of the tire, which angle may range from about 14° to about 70° but preferably is chosen to lie between about 20° and about 45°. Where the breaker utilizes lamelliform metallic reinforcing elements, as in the single-layer ply structure 21', these will generally be in the form of thin flat metal, preferably steel, strips or bands 23 (FIG. 3) having a thickness $t$ between about 0.12 and 0.40 mm, preferably on the order of about 0.25 mm, and a width $w$ between about 1 and 3 mm, and the lateral spacing $s$ (FIG. 5) of adjacent strips or bands in the ply structure will be between about 0.5 and 1 mm. On the other hand, where the breaker utilizes filiform metallic reinforcing elements, as in the single-layer ply structure 21'', these will generally be in the form of round metal, preferably steel, wires or cables 24 (FIG. 6) having an effective diameter $d$ between about 0.25 and 2.5 mm, and the lateral spacing $s'$ of adjacent wires or cables in the ply structure will be between about $0.5d$ and $1.0d$.

The plural-layer ply structure 22, for the purposes of the present invention, is constituted by a single length of weftless 0° breaker cord fabric, in which all the cords extend substantially parallel to the longitudinal dimension of the fabric, wound in a continuous spiral circumferentially about the crown region of the carcass 11–12 for at least a plural number (i.e. at least two) of full turns equal to the number of layers desired. For optimum performance of tires according to the present invention, the preferred breaker construction has been found to be one characterized by a plural layer ply structure 22 having three superimposed layers 22a, 22b and 22c (FIGS. 1 and 2) defined by a single length of cord fabric wound in a continuous spiral (FIG. 7) circumferentially of the tire carcass for the requisite number of full turns and preferably for a small fraction of an additional turn to dispose the outer terminal end section 22d of the fabric in overlapping relation to the inner terminal end section 22e by an amount $c$ equal to about 20 mm.

The breaker 20 according to the present invention, when disposed between the tread and the outer carcass ply of a tire, imparts to the latter, on the one hand, a transverse rigidity that contributes greatly to improved road-holding and cornering ability, particularly when the reinforcing elements in the single-layer ply structure are thin and flat steel strips or bands. The enhanced transverse rigidity does not interfere with the flexibility of the sidewalls, of course, since the ply structure 21 generally is narrower than the tread. On the other hand, the breaker 20 also imparts to the tire an increased resistance to ply separation, which would tend to occur under the influence of centrifugal force at high speeds, by virtue of the 0° orientation of the textile cords of the plural-layer ply structure. The result of this orientation is that the tensile stresses which are generated in any given part of the breaker under the influence of centrifugal force, are directed along the said cords, i.e., circumferentially of the tire. By way of contrast, in a belt or breaker of conventional construction comprising superposed plies of crossed cords, the stresses break down into components oriented primarily in the directions of the cords or cables of the different plies, i.e., to a substantial extent transversely of the tire, except at the lateral extremities of the plies where the stresses remain oriented along the corresponding parallels to the median equatorial plane. Consequently, there exists a tendency, at the edges of the plies, toward a spreading and separation of the cords. It is this which leads to the creation of splits or cracks in the rubber of the edges of the breaker plies, with the adverse effects implied by such a deterioration. Because of the orientation of the textile cords in the plural-layer ply structure of the breaker according to the present invention at a 0° angle, i.e., parallel, to the median equatorial plane of the tire, however, this phenomenon is effectively avoided.

That the transverse rigidity imparted to tires provided with breakers according to the present invention is at acceptable levels is demonstrated by means of measurements of the force in kg which must be applied transversely to such a tire in order to obtain a slip angle of 2°. Merely by way of example, for three tires identical in all respects except for the breaker constructions, which included identical outer plural layer ply structures 22 (3 turns of 0° polyester cord fabric in each case) in conjunction with respectively different inner single-layer ply structures 21 (lamelliform steel reinforcing elements 23 in each case but oriented at angles of 20°, 45° and 70° to the median equatorial plane in the several tires), the forces measured at a speed of 40 km/hr were 150 kg, 140 kg and 90 kg, respectively. These results, of course, also give the reason for the preference of the 45° or below bias angles for the metallic reinforcing elements in the single-layer breaker ply structures.

Tires according to the present invention have, moreover, shown dramatically increased high speed capability. Again merely by way of example, tires identical to the three types referred to above, as well as one differing therefrom only in the use of rayon in lieu of polyester, and all designated 165 R 14 (standard European passenger car tire nomenclature denoting a radial tire with a nominal width of 165 mm and a rim diameter of 14 inches), when tested on a testing machine, have withstood speeds between 255 and 275 km/hr (approximately 159 and 172 mph), while a tire utilizing a breaker including a plural-layer ply structure of three turns of 0° nylon and a single-layer ply structure of lamelliform steel reinforcing elements at an angle of 20° to the median equatorial plane withstood speeds ranging up to 295 km/hr. Even tires comprising only two layers of 0° polyester cord in the outer ply structure of the breaker in conjunction with a 20° lamelliform steel inner ply structure have withstood speeds ranging up to 265 km/hr. In contrast thereto, several types of high speed radial tires presently available on the market and having the same dimensions, withstood, under the same test conditions, maximum speeds on the order of magnitude of only 225 km/hr (approximately 141 mph). These indications bring out the important part played by the non-metallic outer breaker ply structure having the reinforcing elements disposed parallel to the equatorial plane, in resisting the harmful effects of centrifugal force which has a tendency to expand the breaker in diameter, especially at its edges.

As previously mentioned, the principles of the present invention may also be embodied in a breaker construction where the single-layer ply structure 21 of bias-laid metallic reinforcing elements is disposed radially outwardly of, i.e. in circumferentially surrounding relation to, the plural-layer ply structure 22 of non-metallic textile reinforcing elements. This arrangement is illustrated in FIG. 2A which, except for the relative locations of the ply structures 21 and 22, is identical to FIG. 2 and thus requires no further description. Tires according to this aspect of the invention have shown no incidence of ply separation when run at high speeds and have withstood speeds on the order of magnitude of 275 km/hr.

There is, however, one area of distinction between tires characterized by the two types of breaker construction. The lateral thrust at a 0° slip angle undergone during normal high-speed forward movement by a tire having the 0° non-metallic ply structure disposed outwardly of the bias-laid metallic ply structure, is close to zero and practically negligible. On the other hand the lateral thrust which a tire according to the invention having an outer metallic ply structure undergoes during normal high-speed forward movement, at a 0° slip angle, is no longer negligible and, all other things being equal, can reach values ranging up to 50 kg. It will be understood that this lateral thrust is a function of the angular orientation of the inextensible metallic reinforcing elements in the outer single-layer ply structure underlying the tread, and of the interaction of these elements with the road surface when the tire rolls over the ground. It will further be understood that the lateral thrust, for a given direction of rotation of the tire, is always directed in one sense, e.g. either to the right or to the left, independently of the direction of mounting of the tire, and will be reversed when the direction of tire rotation is reversed.

This property can be made use of in the production of tires which have, by virtue of their structure, the built in ability to provide a lateral force to be transmitted to the axes of the wheels of the vehicle on which such tires are mounted. It is possible, therefore, by appropriately arranging the single-layer ply structure, i.e. by building each tire so as to dispose the reinforcing elements of the said ply structure with respect to the median equatorial plane either in the direction represented in FIG. 2A or in the direction crossed and symmetrical thereto, to produce tires which provide, at a 0° slip angle, a lateral force directed either outboardly or inboardly of the vehicle during normal forward movement thereof. This, as will be seen, enables the matching of tires to be mounted on any given axle of the vehicle, in such a way as to modify its reactions with a view to improving its stability. To take full advantage of this aspect of the invention, of course, each tire having the single-layer ply structure located outwardly of the plural-layer ply structure must be provided with means, on the tire or in association therewith, for indicating to the user the manner in which the tire should be mounted on the vehicle to ensure that upon forward movement thereof, the desired lateral thrust will be exerted in the proper direction.

It will be understood that the foregoing description of preferred embodiments of the present invention is for purposes of illustration only, and that the various structural and operational features herein disclosed are susceptible to a number of modifications and changes none of which entails any departure from the spirit and scope of the present invention as defined in the hereto appended claims.

Having thus described the invention, what is claimed and desired to be protected by Letters Patent is:

1. A pneumatic tire capable of being run at very high speeds, comprising a radial ply carcass, a tread surrounding the crown region of the carcass, sidewalls overlying the lateral regions of the carcass from the bead regions of the tire to the marginal regions of said tread, and a tread-reinforcing breaker disposed circumferentially about the crown region of the carcass between the latter and said tread, said breaker being constituted by a single-layer ply structure including elongated reinforcing elements made of metallic material and by a plural-layer ply structure including elongated reinforcing elements made of non-metallic textile material, said ply structures being arranged one in superposed relation to the other, said metallic reinforcing elements in said single-layer ply structure being oriented at a bias angle of between about 14° and 70° to the median equatorial plane of the tire, said plural-layer ply structure being constituted by a single length of textile breaker cord fabric extending circumferentially about the crown region of the carcass in a continuous spiral for at least a plurality of full turns, said non-metallic textile reinforcing elements in said plural-layer ply structure being oriented at an essentially 0° angle to the median equatorial plane of the tire, the width of said single-layer ply structure being at most equal to that of said tread, and the width of said plural-layer ply structure being a predetermined amount greater than that of said tread so that the lateral marginal regions of said plural-layer ply structure are disposed in the radially outwardmost portions of the respective sidewall regions of the tire without any undesirable crimping of said non-metallic textile reinforcing elements in said marginal regions of said plural-layer ply structure.

2. A pneumatic tire according to claim 1, wherein the total width of said plural-layer ply structure is at least 20 mm greater, distributed symmetrically of the median equatorial plane of the tire, than the width of said tread.

3. A pneumatic tire according to claim 1, wherein the total width of said single-layer ply structure is at most 20 mm less, distributed symmetrically of the median equatorial plane of the tire, than the width of said tread.

4. A pneumatic tire according to claim 3, wherein the total width of said plural-layer ply structure is at least 20 mm greater, distributed symmetrically of the median equatorial plane of the tire, than the width of said tread.

5. A pneumatic tire according to claim 1, wherein said metallic reinforcing elements in said single-layer ply structure are thin flat strips or bands of steel each between about 0.12 and 0.40 mm thick and between about 1 and 3 mm wide, with adjacent ones of said strips or bands being spaced between about 0.5 and 1 mm apart.

6. A pneumatic tire according to claim 1, wherein said metallic reinforcing elements in said single-layer ply structure are round steel wires or cables each having an effective diameter between about 0.25 and 2.5 mm, with adjacent ones of said wires or cables being spaced between about one half and one full wire or cable diameter apart.

7. A pnuematic tire according to claim 1, wherein said metallic reinforcing elements in said single-layer ply structure are oriented at an angle of between about 20° and 45° to the median equatorial plane of the tire.

8. A pneumatic tire according to claim 1, wherein said plural-layer ply structure is disposed in circumferentially surrounding relation to said single-layer ply structure.

9. A pneumatic tire according to claim 1, wherein said single-layer ply structure is disposed in circumferentially surrounding relation to said plural-layer ply structure.

10. A pneumatic tire according to claim 9, further comprising means associated with the tire for indicating the manner in which the same should be mounted on a vehicle so as to ensure that upon forward movement of the latter, the lateral thrust generated by the tire due to the interaction of said metallic reinforcing elements in said single-layer ply structure with the road surface over which the tire is rolling, is oriented in the proper direction with respect to the vehicle.

11. A pneumatic tire according to claim 1, wherein said non-metallic textile reinforcing elements in said plural-layer ply structure are made of synthetic filaments of a material selected from the group consisting of glass fiber, nylon, rayon, polyester and the like.

12. A pneumatic tire according to claim 11, wherein said non-metallic reinforcing elements are made of nylon, rayon, or polyester.

13. A pneumatic tire according to claim 12, wherein said metallic reinforcing elements in said single-layer ply structure are made of steel.

14. A pneumatic tire according to claim 13, wherein said plural-layer ply structure extends about said crown region of said carcass for a small amount more than said number of full turns sufficient to create an overlap of about 20 mm of the outermost terminal section of said breaker cord fabric relative to the innermost terminal section thereof.

15. A pneumatic tire according to claim 14, wherein said steel reinforcing elements are in the form of thin flat strips or bands each between about 0.12 and 0.40 mm thick and between about 1 and 3 mm wide, with adjacent ones of said strips or bands being spaced between about 0.5 and 1 mm apart.

16. A pneumatic tire according to claim 14, wherein said steel reinforcing elements are in the form of round wires or cables each having an effective diameter between about 0.25 and 2.5 mm, with adjacent ones of said wires or cables being spaced between about one half and one full wire or cable diameter apart.

17. A pneumatic tire according to claim 14, wherein said plural-layer ply structure includes three full turns of said breaker cord fabric in addition to said overlap.

18. A pneumatic tire according to claim 17, wherein said steel reinforcing elements are in the form of thin flat strips or bands each between about 0.12 and 0.40 mm thick and between about 1 and 3 mm wide, with adjacent ones of said strips or bands being spaced between about 0.5 and 1 mm apart.

19. A pneumatic tire according to claim 17, wherein said steel reinforcing elements are in the form of round wires or cables each having an effective diameter between about 0.25 and 2.5 mm, with adjacent ones of said wires or cables being spaced between about one half and one full wire or cable diameter apart.

20. A pneumatic tire according to claim 14, wherein said plural-layer ply structure includes two full turns of said breaker cord fabric in addition to said overlap.

21. A pneumatic tire according to claim 20, wherein said steel reinforcing elements are in the form of thin flat strips or bands each between about 0.12 and 0.40 mm thick and between about 1 and 3 mm wide, with adjacent ones of said strips or bands being spaced between about 0.5 and 1 mm apart.

22. A pneumatic tire according to claim 20, wherein said steel reinforcing elements are in the form of round wires or cables each having an effective diameter between about 0.25 and 2.5 mm, with adjacent ones of said wires or cables being spaced between about one half and one full wire or cable diameter apart.

23. A pneumatic tire according to claim 1, wherein said plural-layer ply structure includes two full turns of said breaker cord fabric.

24. A pneumatic tire according to claim 1, wherein said plural-layer ply structure includes three full turns of said breaker cord fabric.

25. A pneumatic tire according to claim 1, wherein said plural-layer ply structure extends about said crown region of said carcass for a small amount more than said number of full turns sufficient to create an overlap of about 20 mm of the outermost terminal section of said breaker cord fabric relative to the innermost terminal section thereof.

26. A pneumatic tire according to claim 25, wherein said plural-layer ply structure includes three full turns of said breaker cord fabric in addition to said overlap.

27. A pneumatic tire according to claim 25, wherein said plural-layer ply structure includes two full turns of said breaker cord fabric in addition to said overlap.

* * * * *